United States Patent [19]

Schlimmer et al.

[11] Patent Number: 5,324,496
[45] Date of Patent: Jun. 28, 1994

[54] PROCESS USING AN ACIDIC MEDIUM CONTAINING NITRIC ACID

[76] Inventors: Joanne F. Schlimmer, 212 Stallion Road, Beaulieu, Beaulieu, Midrand, Transvaal, South Africa; Bengt A. Karlsson, 91044 ANa SET, Nybytorpet 2010, Sweden

[21] Appl. No.: 869,334

[22] Filed: Apr. 15, 1992

[30] Foreign Application Priority Data

Apr. 15, 1991 [ZA] South Africa .................. 91/2785

[51] Int. Cl.$^5$ .......................... B01F 1/00; C01B 31/06
[52] U.S. Cl. ................... 423/446; 423/658.5
[58] Field of Search ................... 423/446, 658.5

[56] References Cited

U.S. PATENT DOCUMENTS

| | | | |
|---|---|---|---|
| 2,805,940 | 9/1957 | Bennedsen | 423/150.1 |
| 2,947,611 | 8/1960 | Bundy | 423/446 |
| 3,442,616 | 5/1969 | Wakatsuki et al. | 423/446 |
| 3,965,239 | 6/1976 | Posel | 423/34 |
| 3,992,270 | 11/1976 | Lemarinel et al. | 204/113 |
| 4,084,961 | 4/1978 | Caldon | 423/41 |
| 4,224,380 | 9/1980 | Bovenkerk et al. | 51/309 |
| 4,670,051 | 6/1987 | Schneider | 423/150.1 |
| 4,931,068 | 6/1990 | Dismukes et al. | 51/293 |

FOREIGN PATENT DOCUMENTS

| | | |
|---|---|---|
| 2601017 | 7/1977 | Fed. Rep. of Germany . |
| 2279447 | 2/1976 | France . |
| 905282 | 9/1962 | United Kingdom . |

Primary Examiner—Michael Lewis
Assistant Examiner—Steven Bos
Attorney, Agent, or Firm—Scully, Scott, Murphy & Presser

[57] ABSTRACT

A process such as a leaching, etching or pickling process which uses an aqueous acidic medium containing nitric acid is improved by carrying out the process in the presence of an oxidizing atmosphere in a closed contained.

5 Claims, No Drawings

PROCESS USING AN ACIDIC MEDIUM CONTAINING NITRIC ACID

BACKGROUND OF THE INVENTION

This invention relates to a process which uses an acidic medium containing nitric acid.

There are many processes which use acidic mediums containing nitric acid, i.e. nitrate containing acids. Such processes are, for example, leaching, etching and pickling. Acidic effluents are produced by such processes and these effluents have to be neutralised. This requires the use of substantial quantities of alkali. Also, the consumption of nitric acid is high. A further problem with these processes is the emission of nitrogen oxide gases which give rise to environmental problems.

SUMMARY OF THE INVENTION

In a process using an aqueous acidic medium containing nitric acid, the invention provides the improvement of carrying out the process in the presence of an oxidising atmosphere in a closed container.

DESCRIPTION OF EMBODIMENTS

The essential feature of the process of the invention is that it is carried out in a suitable oxidising atmosphere in a closed container. This has the effect of oxidising nitrogen oxide gases, particularly nitrous oxide, produced by the process. Nitrous oxide is oxidised to nitric oxide which dissolves in the water of the acidic medium. In this manner nitric acid is regenerated. Thus, the consumption of nitric acid is substantially reduced. Further, the necessity to neutralise the effluent is also substantially reduced. The chemical reactions which take place are:

$$NO + \tfrac{1}{2}O_2 \rightarrow NO_2$$

$$NO + NO_2 + H_2O \sim 2H^+ + 2NO_2^-$$

$$3HNO_{2(aq)} \sim HNO_3 + H_2O + 2NO$$

The container in which the reaction takes place is closed in the sense that it is closed or sealed to atmosphere. Such containers, e.g. pressure cylinders are well known in the art and any such container may be used. During the process gases are produced and so the pressure within the container will tend to rise to an equilibrium state which is above atmospheric pressure.

Generally, the oxidising atmosphere will have an oxygen content of at least 40 percent by volume. The source of the oxygen may be oxygen in gaseous form or a material such as a peroxide which will release oxygen. The oxidising atmosphere will typically be oxygen-enriched air or oxygen.

The process of the invention has application to a wide range of leaching, etching and pickling processes using an aqueous acidic medium containing nitric acid. In these processes, $NO_x$ gases, particularly nitrous oxide, are produced. These gases are oxidised, as discussed above.

The process will generally be carried out on a batch basis although it can also be carried out on a continuous basis.

The acidic medium will preferably be, or contain, a mixture of sulphuric and nitric acids. The source of the nitric acid may be nitric acid itself or a suitable nitrate such as sodium nitrate. In this latter case, sodium nitrate may be mixed with concentrated sulphuric acid and then diluted, if desired, with water.

The process of the invention has particular application to the recovery abrasive grit from a metal body containing the grit. The metal body is dissolved in the acidic medium releasing the grit.

In an example of the invention, a process of recovering abrasive grit from a reaction capsule containing the grit dispersed in a metal body includes the steps of crushing the capsule and metal body, mixing the crushed mass with sodium nitrate or an acidic medium containing nitric acid, charging a container with the mixture, agitating the mixture, adding an acid such as sulphuric acid to the container, replacing the gas in the container with oxygen, adding water to the mixture in the container, sealing the container to atmosphere, pressurising the container to a pressure above atmospheric with the oxygen, allowing the acidic medium to dissolve the metal in the container and release the abrasive grit, bringing the contents of the container to ambient pressure, removing liquid from the container and recovering the abrasive grit.

A process, as described above, was used to recover diamond grit from a reaction capsule in which the metal body was cobalt. This process was compared with a conventional recovery process carried out in a vessel open to atmosphere and the results obtained are set out below.

| Quantity | COBALT LEACHING | | |
|---|---|---|---|
| | Prior Art | Invention | Ratio |
| 100% $HNO_3$ | 6,25 kg | 0,38 kg | 0,06 |
| Volume $H_2SO_4$ | 2,6 l | 2,6 l | 1 |
| Oxygen 200 bar | — | 1,5 l | — |
| Water addition | 12,5 l | 5,9 l | 0,5 |
| Total liquid effluent | 17,6 | 7,6 | 0,4 |
| Nitric Fume Emission (100% $NO_x$ atmospheric) | 0,8 $m^3$ | Trace | — |

The advantages of the process of the invention over that of the prior art can be seen from the above table. First, the consumption of nitric acid is substantially reduced. Second, the total liquid effluent is reduced resulting in less consumption of neutralising alkali. Third, the nitric fume emission is substantially reduced improving the environmental friendliness of the leaching process. Finally, the recovery of the diamond grit by the process of the invention was as good as that obtained with the prior art method.

The process described above was repeated using 0,3 bar oxygen pressure. The dissolution of the metal took somewhat longer, but the remaining advantages over the prior art process were the same.

The process of the invention was used to etch AISI 316 type stainless steel with a nitric/sulphuric acid solution and similar advantages were obtained.

We claim:

1. A process of recovering abrasive grit from a metal body containing such grit comprising the steps of:
   (a) providing a reaction capsule containing abrasive grit dispersed in a metal body;
   (b) crushing the reaction capsule and the metal body into a crushed mass;
   (c) mixing the crushed mass with a nitrate or an acidic medium containing nitric acid;
   (d) charging a container with the mixture of step (c);

(e) agitating the mixture;

(f) adding an acid other than nitric acid to the container;

(g) replacing the gas in the container with an oxidizing atmosphere;

(h) adding water to the mixture in the container;

(i) sealing the container to the atmosphere;

(j) pressurizing the container to a pressure above atmospheric with the oxidizing atmosphere;

(k) allowing the acidic medium to dissolve the metal in the container and to release the abrasive grit;

(l) bringing the contents of the container to ambient pressure;

(m) removing the liquid from the container; and (n) recovering the abrasive grit.

2. A process according to claim 1 wherein the acidic medium contains a mixture of sulphuric and nitric acids.

3. A process according to claim 1 wherein the other acid is sulphuric acid.

4. The process according to claim 1 wherein the oxidizing atmosphere has an oxygen content of at least 40 percent by volume.

5. The process according to claim 1 wherein the oxidizing atmosphere is oxygen-enriched air or oxygen.

* * * * *

UNITED STATES PATENT AND TRADEMARK OFFICE
CERTIFICATE OF CORRECTION

PATENT NO. : 5,324,496
DATED : June 28, 1994
INVENTOR(S) : Johanne F. Schlimmer, et al.

It is certified that error appears in the above-indentified patent and that said Letters Patent is hereby corrected as shown below:

Column 2, line 34: "2,61" and "2,61" should read --2,6%-- and --2,6%--
Column 2, line 35: "1,51" should read --1,5%--
Column 2, line 36: "12,51" and "5,91" should read --12,5%-- and --5,9%--

Signed and Sealed this

Third Day of January, 1995

Attest:

BRUCE LEHMAN

Attesting Officer   Commissioner of Patents and Trademarks